(12) United States Patent
Wu

(10) Patent No.: US 9,223,150 B2
(45) Date of Patent: Dec. 29, 2015

(54) EYEGLASSES ABLE TO INSTANTLY INSTALL OR REMOVE LENS

(71) Applicant: Chih Ming Wu, Tainan (TW)

(72) Inventor: Chih Ming Wu, Tainan (TW)

( * ) Notice: Subject to any disclaimer, the term of this patent is extended or adjusted under 35 U.S.C. 154(b) by 288 days.

(21) Appl. No.: 14/038,788

(22) Filed: Sep. 27, 2013

(65) Prior Publication Data

US 2015/0092151 A1 Apr. 2, 2015

(51) Int. Cl.
*G02C 1/00* (2006.01)
*G02C 13/00* (2006.01)
*G02C 1/06* (2006.01)

(52) U.S. Cl.
CPC . *G02C 13/00* (2013.01); *G02C 1/06* (2013.01)

(58) Field of Classification Search
USPC ...................... 351/86, 106, 83, 103
See application file for complete search history.

(56) References Cited

U.S. PATENT DOCUMENTS

| | | | | |
|---|---|---|---|---|
| 5,587,747 A * | 12/1996 | Bernheiser | ................... | 351/105 |
| 6,533,412 B1 * | 3/2003 | Wang et al. | ..................... | 351/86 |
| 7,219,993 B1 * | 5/2007 | Chiou | ........................... | 351/103 |
| 7,497,569 B2 * | 3/2009 | Webb | ............................ | 351/106 |

* cited by examiner

*Primary Examiner* — Hung Dang

(57) ABSTRACT

A pair of eyeglasses includes a lens and a frame. The frame has a holder and two temples connected to two ends of the holder. The holder has a clip slot able to fix the lens. A through hole is defined in the holder and communicates with the clip slot. A bead and a spring are accommodated in the through hole. A restriction member is connected to the holder and blocks the through hole at the inside of the holder. The spring is installed between the bead and the restriction member. The bead partially protrudes from the through hole. The lens has a positioning portion corresponding to the bead. The bead that partially protrudes from the through hole is engaged with the positioning portion. The lens is easily installed or removed by shifting the bead in the clip slot from the positioning portion of the lens.

10 Claims, 6 Drawing Sheets

EYEGLASSES ABLE TO INSTANTLY INSTALL OR REMOVE LENS

FIELD OF THE INVENTION

The present invention relates to a pair of eyeglasses, and more particularly, to a pair of eyeglasses which are able to instantly install or remove its' lenses.

BACKGROUND OF THE INVENTION

There are different types of eyeglasses which have different purposes such as the eyeglasses for correcting myopia, reading glasses, sunglasses, goggles and diving goggles. The eyeglasses have more and more variety functions. Sometimes, fishing line can be used to replace the lower portion of the rims of some glasses so as to secure the lenses, or the lenses are directly adhered to the frame. However, theses lenses are difficult to be replaced and the frames of the glasses involve complicated manufacturing steps. In addition, the manufacturing cost is high.

The present invention can provide a pair of eyeglasses to improve the mentioned shortcomings.

SUMMARY OF THE INVENTION

The present invention relates to a pair of eyeglasses able to instantly install or remove lens by using the clip slot to firmly secure the lens and a spring's resilience to push a bead against the lens in order to be firmly in position.

The present invention relates to a pair of eyeglasses able to instantly install or remove lens is comprised of a lens and a frame including a holder and two temples respectively connected to both end of the holder. A clip slot opened downwardly is defined respectively in both side of the holder. The width of the clip slot is adapted to the width of the lens. A through hole is defined in the holders and transversely communicates with the clip slot. A bead and a spring are accommodated in the through hole. A restriction member is respectively connected to the holders and blocks the through holes at the inside of the frame. The spring is installed between the bead and the restriction member as so to the spring able to push the bead by abutting upon the restriction member. The bead partially protrudes from the through hole.

Preferably, the restriction member is a bridge which is removably connected to a middle portion of the holder.

Preferably, the width of the clip slot is smaller than the diameter of the bead.

Preferably, the holder has two rims and a connection portion is connected between the two rims. The clip slot and the through hole are located in the connection portion.

Preferably, each of the two rims has a fixing member located therein so as to secure the lens with different function.

Alternatively, the present invention also provides a pair of eyeglasses able to instantly install or remove lens is comprised of a lens and a frame. The frame has a holder and two temples are connected to both ends of the holder. The frame has a clip slot which is opened downwardly. The width of the clip slot is adapted to the width of a lens. A through hole is defined in the holder and communicates with the clip slot. A bead and a spring are accommodated in the through hole. A restriction member is connected to the frame and blocks the through hole at the inside of the frame. The spring is installed between the bead and the restriction member as so to the spring able to push the bead against the lens by abutting upon the restriction member. The bead partially protrudes from the through hole. The lens is removably secured in the clip slot and has a positioning portion corresponding to the bead. The portion of the bead that protrudes from the through hole is engaged with the positioning portion.

Preferably, the positioning portion of the lens is a recess.
Preferably, the positioning portion of the lens is a hole.
Preferably, the restriction member is a bridge which is removably connected to the middle portion of the holder.
Preferably, the width of the clip slot is smaller than the diameter of bead.

The primary object of the present invention is to provide a pair of eyeglasses wherein the lens can be quickly and conveniently installed or removed by using the spring's resilience to push the bead into the positioning portion as so to firmly secure the lens into the frame. The installing procedures are simplified by having the contracture so that the working efficiency can be enhanced.

The present invention will be more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
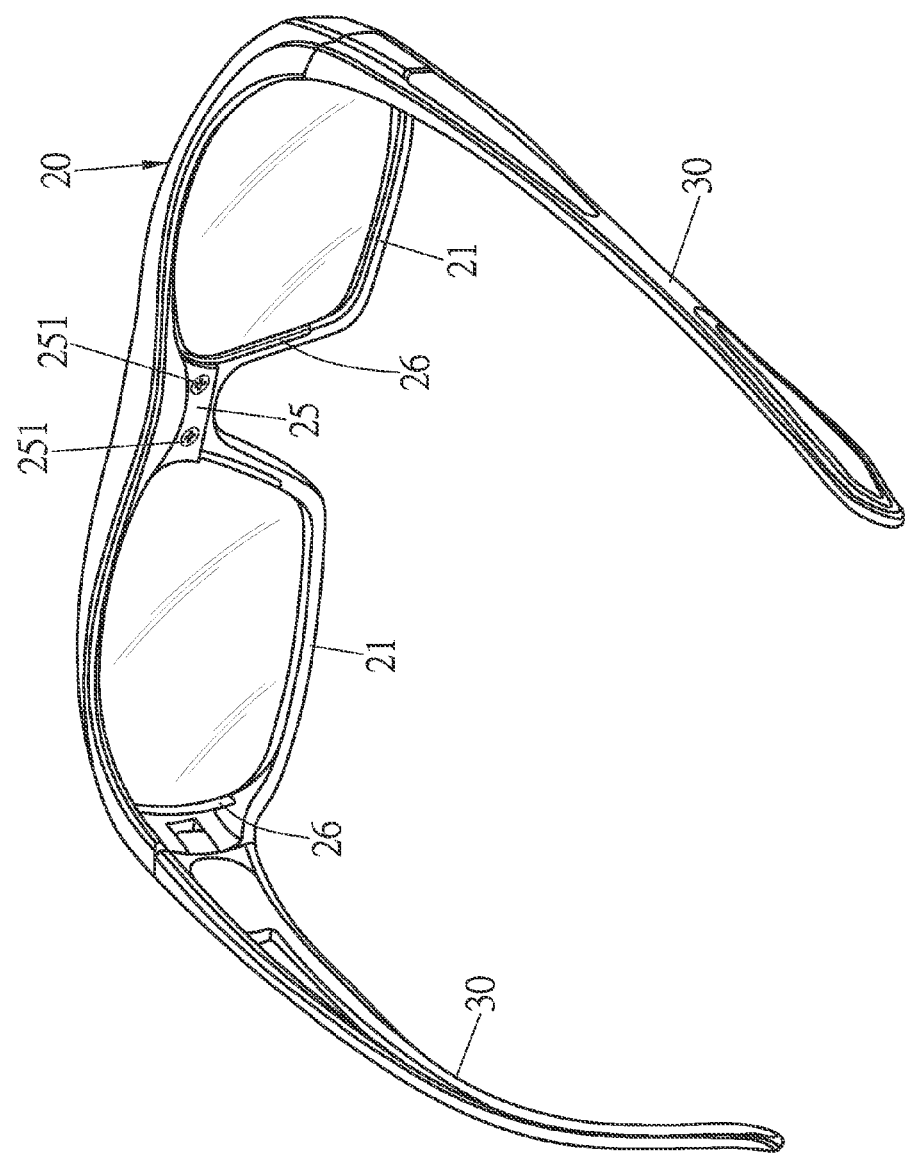
FIG. 1 is a perspective view to show the eyeglasses of the present invention.
Figure 2:
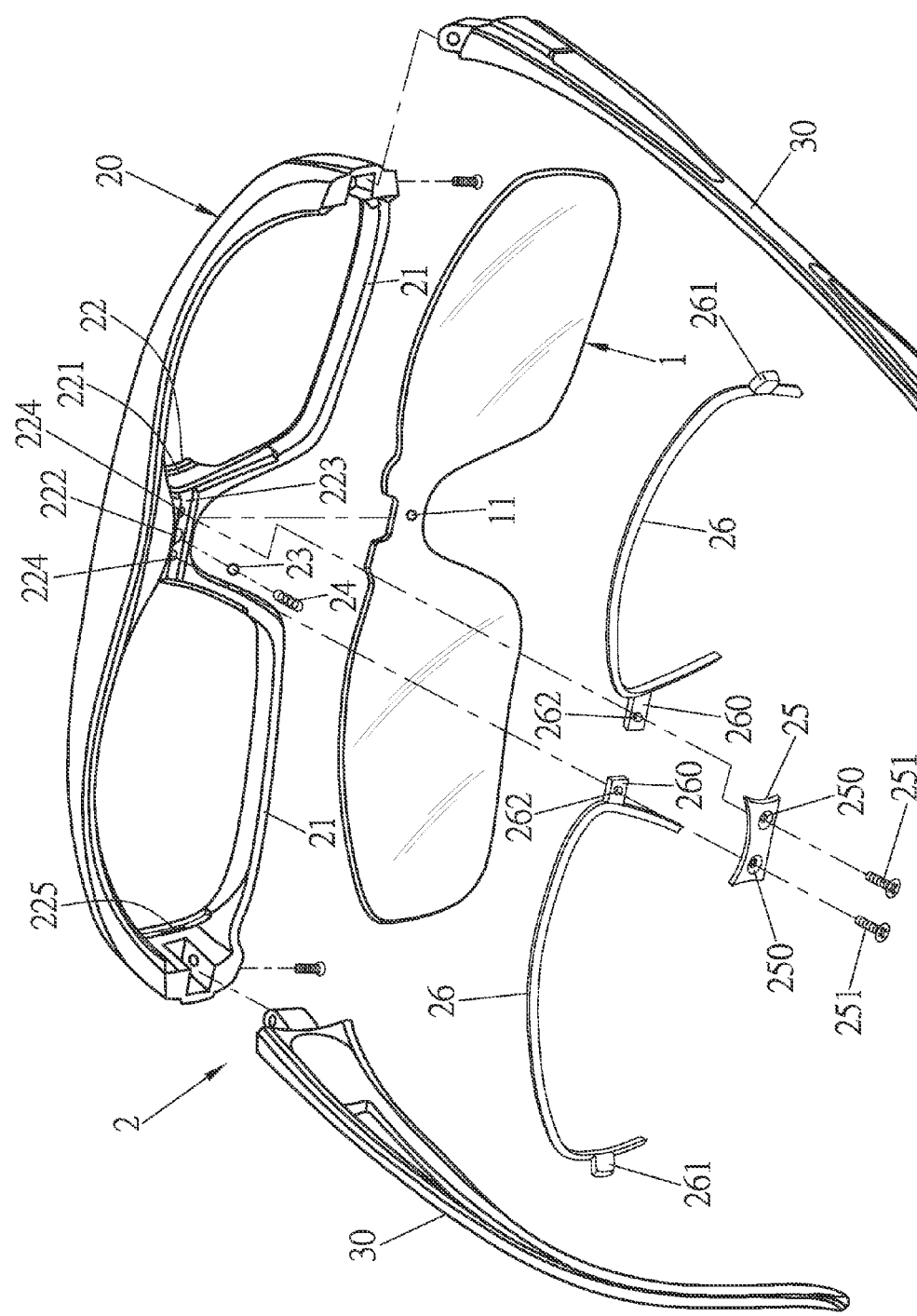
FIG. 2 is an exploded view to show the eyeglasses of the present invention.
Figure 3:
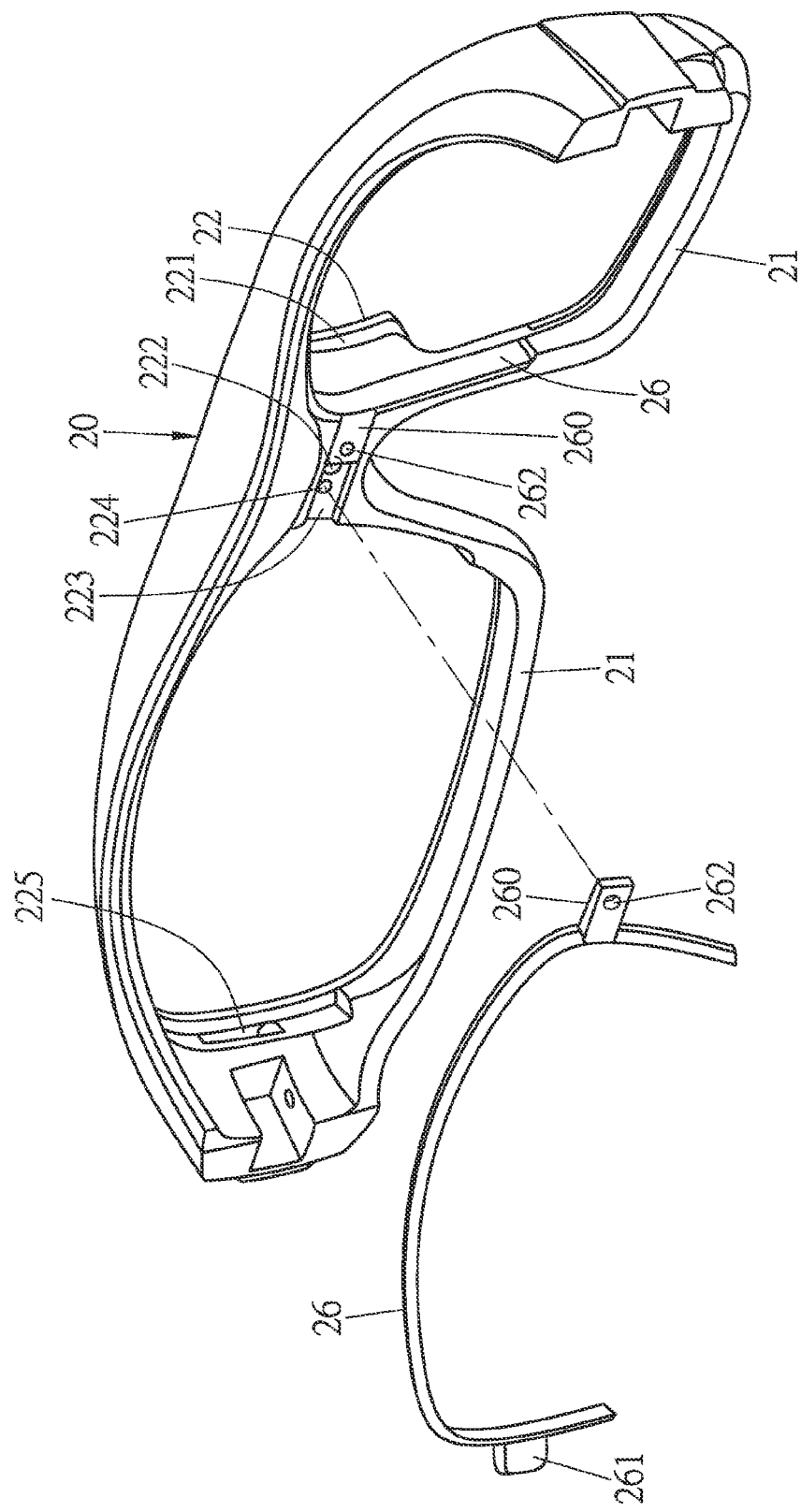
FIG. 3 is an exploded view to show the holder and the fixing member of the eyeglasses of the present invention.
Figure 4:
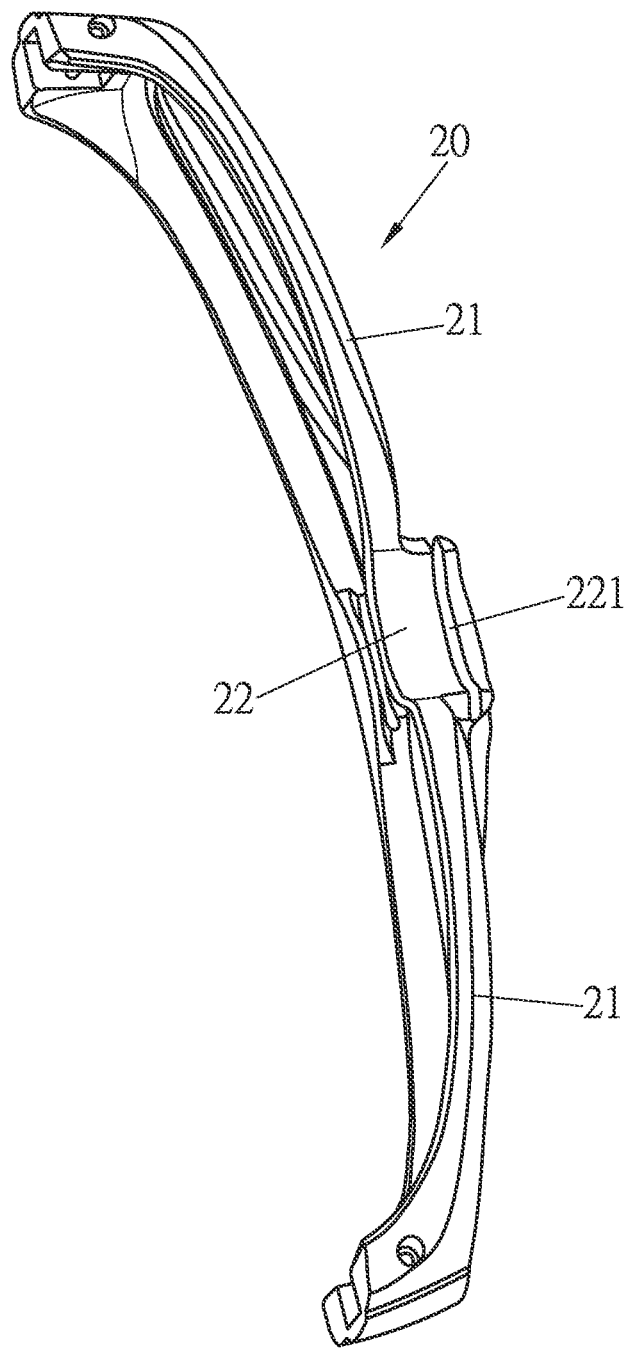
FIG. 4 is another angle view of the holder of the eyeglasses of the present invention.

Referring to FIGS. 1 to 5, a pair of eyeglasses of the present invention is comprised of a lens 1 and a frame 2, wherein the lens 1 is made in one-piece and has a positioning portion 11 at the middle portion thereof. The positioning portion 11 can be a recess or a hole.

The frame 2 is included a holder 20 and two temples 30 which are connected to both ends of the holder 20. The holder 20 has two rims 21 and a connection portion 22 is connected between the two rims 21. The connection portion 22 of the holder 20 has a clip slot 221 opened downwardly. The width of the clip slot 221 is adapted to the width of the lens 1. A through hole 222 is defined in the holder 20 and communicates with the clip slot 221. The connection portion 22 of the holder 20 has a recessed area 223 defined in the inside thereof which communicates with the through hole 222. Two threaded holes 224 are defined in the recessed area 223. Each of the two rims 21 has an engaging slot 225 defined in the inside of the outer end thereof. A bead 23 and a spring 24 are accommodated in the through hole 222. A restriction member 25 is connected to the holder 20 and blocks the through hole 222 inside of the holder 20. The restriction member 25 can be a bridge. The restriction member 25 is removably installed at the inner side of the connection portion 22 and has two apertures 250 corresponding to the two threaded holes 224 of the recessed area 223. Two screws 251 are fastened into the apertures 250 to connect to the threaded holes 224 as so to fix the restriction member 25 to the inside of the connection member 22. The spring 24 is installed between the bead 23 and the restriction member 25. The bead 23 partially protrudes from the through hole 222. The width of the clip slot 2221 is smaller than the diameter of the bead 23 to prevent the bead 23 dropping from the clip slot 221. The two temples 30 are respectively and pivotably connected to the two outer ends of the two rims 21.

Each of the two rims 21 has a fixing member 26 located therein so as to secure the lens 1. Each of the rims 26 has a lug 260 and a protrusion 261 extending on two sides thereof. The lug 260 is engaged with the recessed area 223 of the connection portion 22 of the holder 20. The lug 260 has a hole 262 corresponding to the threaded hole 224 of the recessed area 223 of the connection portion 22 and the aperture 250 of the restriction member 25. By the screws 251, the restriction member 25 and the fixing members 26 are fixed to the holder 20. The protrusion 261 of the fixing member 26 is inserted into the engaging slot 225 of the rim 21.

Figure 5:
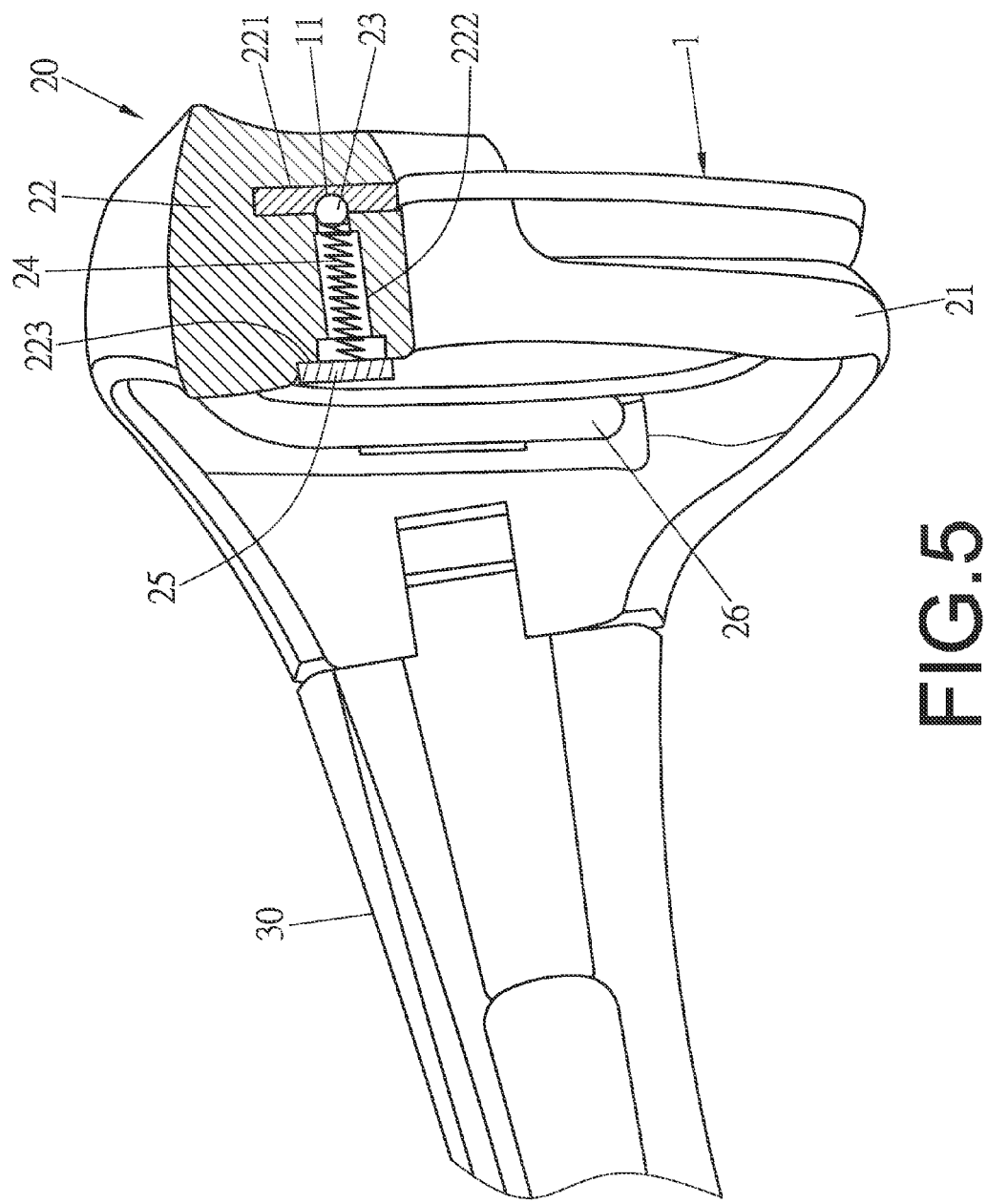
FIG. 5 is a cross sectional view to show the eyeglasses of the present invention.
Figure 6:
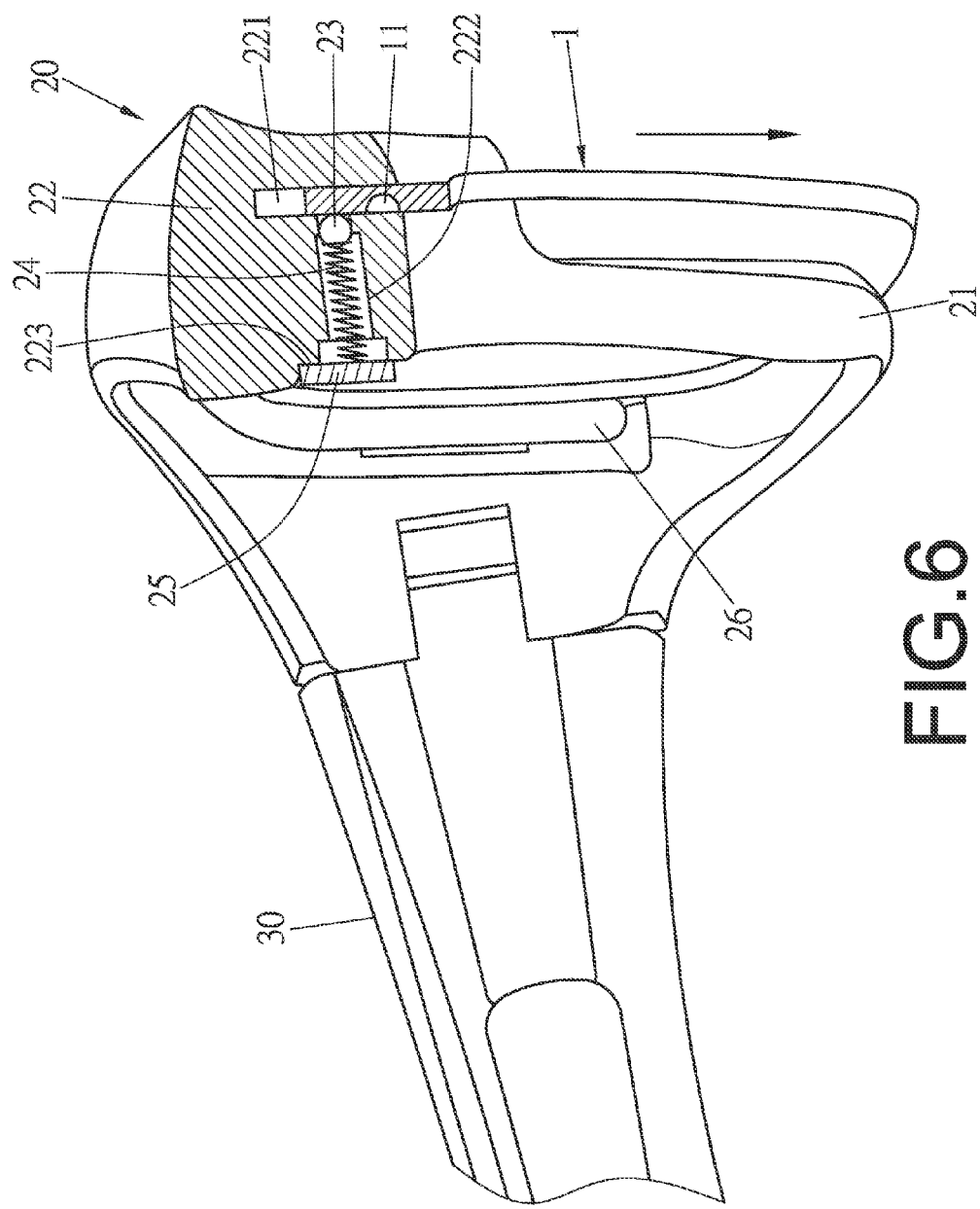
FIG. 6 is a cross sectional view to show the lens removing from the holder of the eyeglasses of the present invention.

When installing the lens 1 to the frame 2, as shown in FIGS. 5 and 6, the middle portion of the lens 1 is engaged with the clip slot 221 of the holder 20 to align the positioning portion 11 of the lens 1 with the through hole 222. The bead 23 is pushed into the positioning portion 11 by the resilience of the spring 24 so that the lens 1 is able to be fixed into the holder 20 without extra forces. When removing the lens 1, the bead 23 is sphere and the positioning portion 11 of the lens 1 is curved, so, when the lens 1 is simply pulled downward, the surface of the lens 1 pushes against the bead 23 to be retracted into the through hole 222 and to compress the spring 24, so that the bead 23 is removed from the positioning portion 11 of the lens 1 and the lens 1 is removed from the holder 20.

The lens 1 is easily engaged with the clip slot 221 of the holder 20, and the spring 24 pushes the bead 23 partially into the positioning portion 11 of the lense 1 so as to be lens 1 is firmly secured into the holder 20, The fixing structure for lens 1 is simple and lens is easily and quickly installed or removed from the holder 20. Hence, the manufacturing cost is also low.

While we have shown and described the embodiment in accordance with the present invention, it should be clear to those skilled in the art that further embodiments may be made without departing from the scope of the present invention.

What is claimed is:

1. A pair of eyeglasses able to instantly install or remove lens is comprised of a holder and two temples connected to both ends of the holder,
    characterized in that the holder having a clip slot opened downwardly, a width of the clip slot adapted to width of the lens, a through hole defined in the holder and communicating with the clip slot, and
    a bead and a spring being accommodated in the through hole, a restriction member connected to the holder and blocked the through hole inside of the holder, the spring being installed between the bead and the restriction member as so to the spring able to push the bead by abutting upon the restriction member, the bead partially protruding from the through hole.

2. The pair of eyeglasses able to instantly install or remove lens as claimed in claim 1, wherein the restriction member is a bridge which is removably connected to a middle portion of the holder.

3. The pair of eyeglasses able to instantly install or remove lens as claimed in claim 1, wherein the width of the clip slot is smaller than a diameter of the bead.

4. The pair of eyeglasses able to instantly install or remove lens as claimed in claim 1, wherein the holder has two rims and a connection portion is connected between the two rims, the clip slot and the through hole are located in the connection portion.

5. The pair of eyeglasses able to instantly install or remove lens as claimed in claim 4, wherein each of the two rims has a fixing member located therein so as to secure lens with variety functions.

6. A pair of eyeglasses able to instantly install or remove lens is comprised of a lens and frame including a holder and two temples connected to both ends of the holder,
    characterized in that the holder having a clip slot opened downwardly, a width of the clip slot adapted to width of the lens, a through hole defined in the holder and communicating with the clip slot,
    a bead and a spring being accommodated in the through hole, a restriction member connected to the holder and blocked the through hole inside of the holder, the spring being installed between the bead and the restriction member as so to the spring able to push against the bead by abutting upon the restriction member, the bead partially protruding from the through hole, and
    the lens removably secured in the clip slot, the lens having a positioning portion corresponding to the bead, a portion of the bead that protrudes from the through hole being engaged with the positioning portion.

7. The pair of eyeglasses able to instantly install or remove lens as claimed in claim 6, wherein the positioning portion of the lens is a recess.

8. The pair of eyeglasses able to instantly install or remove lens as claimed in claim 6, wherein the positioning portion of the lens is a hole.

9. The pair of eyeglasses able to instantly install or remove lens as claimed in claim 6, wherein the restriction member is a bridge removably connected to a middle portion of the frame.

10. The pair of eyeglasses able to instantly install or remove lens as claimed in claim 6, wherein the width of the clip slot is smaller than a diameter of the bead.

* * * * *